(12) United States Patent
Nichols et al.

(10) Patent No.: US 6,923,845 B2
(45) Date of Patent: Aug. 2, 2005

(54) MEMBRANE AIR DRYER FOR VEHICLE AIR BRAKE SYSTEM

(75) Inventors: Randall W. Nichols, Westlake, OH (US); Richard B. Jacobs, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/379,259

(22) Filed: Mar. 4, 2003

(65) Prior Publication Data

US 2004/0074386 A1 Apr. 22, 2004

Related U.S. Application Data

(63) Continuation-in-part of application No. 10/274,215, filed on Oct. 18, 2002.

(51) Int. Cl.[7] .......................... B01D 53/22; B01D 53/26
(52) U.S. Cl. ...................... 95/52; 95/273; 96/8; 96/10
(58) Field of Search .......................... 95/52, 273; 96/4, 96/8, 10

(56) References Cited

U.S. PATENT DOCUMENTS

| | | | |
|---|---|---|---|
| 3,735,558 A | * | 5/1973 | Skarstrom et al. ............ 95/51 |
| 3,845,778 A | | 11/1974 | Bridigum |
| 4,397,661 A | | 8/1983 | King et al. |
| 4,670,145 A | | 6/1987 | Edwards |
| 4,718,921 A | | 1/1988 | Makino et al. |
| 4,857,081 A | | 8/1989 | Taylor |
| 4,881,953 A | * | 11/1989 | Prasad et al. .................. 95/41 |
| 4,883,023 A | | 11/1989 | Tsang et al. |
| 4,929,259 A | | 5/1990 | Caskey et al. |
| 4,959,152 A | * | 9/1990 | Nichols ....................... 210/651 |
| 4,961,760 A | | 10/1990 | Caskey et al. |
| 5,002,590 A | | 3/1991 | Friesen et al. |
| 5,013,331 A | | 5/1991 | Edwards et al. |
| 5,013,437 A | | 5/1991 | Trimmer et al. |
| 5,067,971 A | | 11/1991 | Bikson et al. |
| 5,084,073 A | | 1/1992 | Prasad |
| 5,122,167 A | * | 6/1992 | Daniels ........................ 95/273 |
| 5,160,514 A | | 11/1992 | Newbold et al. |
| 5,259,869 A | | 11/1993 | Auvil et al. |
| 5,282,964 A | | 2/1994 | Young et al. |
| 5,282,966 A | | 2/1994 | Walker |
| 5,314,528 A | | 5/1994 | Monereau |
| 5,334,230 A | | 8/1994 | Sloka |
| 5,411,662 A | | 5/1995 | Nicholas et al. |
| 5,429,662 A | * | 7/1995 | Fillet ............................... 95/14 |
| 5,470,469 A | | 11/1995 | Eckman |
| 5,525,143 A | | 6/1996 | Morgan et al. |
| 5,554,283 A | | 9/1996 | Brinda et al. |
| 5,584,914 A | | 12/1996 | Senoo et al. |
| 5,588,984 A | * | 12/1996 | Verini ............................. 95/15 |
| 5,605,564 A | | 2/1997 | Collins |
| 5,632,805 A | * | 5/1997 | Woodard ......................... 96/4 |
| 5,681,368 A | | 10/1997 | Rahimzadeh |
| 5,779,897 A | | 7/1998 | Kathod et al. |
| 5,800,597 A | | 9/1998 | Perrotta et al. |
| 5,837,033 A | | 11/1998 | Giglia et al. |
| 5,851,267 A | | 12/1998 | Schwartz |
| 5,885,329 A | | 3/1999 | Hermann |

(Continued)

FOREIGN PATENT DOCUMENTS

EP        1 275 432 A        1/2003

*Primary Examiner*—Robert H. Spitzer
(74) *Attorney, Agent, or Firm*—Calfee, Halter & Griswold LLP

(57) ABSTRACT

An air drying system for a vehicle including a membrane air dryer is provided. The air dryer is supplied with a stream of compressed air that has a low and constant concentration of oil vapor. A coalescing filter element may be used to maintain the oil vapor concentration. The filtered material may be discharged from the coalescing filter by a pressure swing drain valve, which discharges the filtered material upon unloading of the compressor.

9 Claims, 2 Drawing Sheets

U.S. PATENT DOCUMENTS

| | | | |
|---|---|---|---|
| 5,961,692 A | 10/1999 | Collins | |
| 6,004,383 A | 12/1999 | Kuhnelt | |
| 6,019,822 A | 2/2000 | Kanzawa et al. | |
| 6,070,339 A | 6/2000 | Cunkelman | |
| 6,083,297 A * | 7/2000 | Valus et al. | 95/44 |
| 6,087,029 A | 7/2000 | Golovin et al. | |
| 6,126,724 A | 10/2000 | Martin et al. | |
| 6,128,825 A | 10/2000 | Cunkelman | |
| 6,210,464 B1 | 4/2001 | Nakanishi | |
| 6,296,683 B1 | 10/2001 | Koch | |
| 6,346,142 B1 | 2/2002 | Jetter et al. | |
| 6,358,300 B1 | 3/2002 | Fornof et al. | |
| 6,370,887 B1 | 4/2002 | Hachimaki | |
| 6,540,817 B1 * | 4/2003 | Hachimaki | 96/8 |
| 6,540,818 B2 * | 4/2003 | Hachimaki | 96/8 |
| 6,585,808 B2 * | 7/2003 | Burban et al. | 96/8 |
| 6,616,735 B1 * | 9/2003 | Burban et al. | 96/8 |
| 6,730,143 B1 * | 5/2004 | Nichols et al. | 95/118 |
| 6,764,529 B2 * | 7/2004 | Nichols et al. | 95/52 |
| 2002/0162451 A1 * | 11/2002 | Bikson et al. | 95/51 |
| 2003/0010205 A1 * | 1/2003 | Bikson et al. | 95/52 |
| 2003/0154856 A1 * | 8/2003 | Anderson | 95/45 |
| 2003/0209141 A1 * | 11/2003 | Wedge et al. | 95/45 |
| 2004/0000233 A1 * | 1/2004 | Nichols et al. | 95/52 |

* cited by examiner

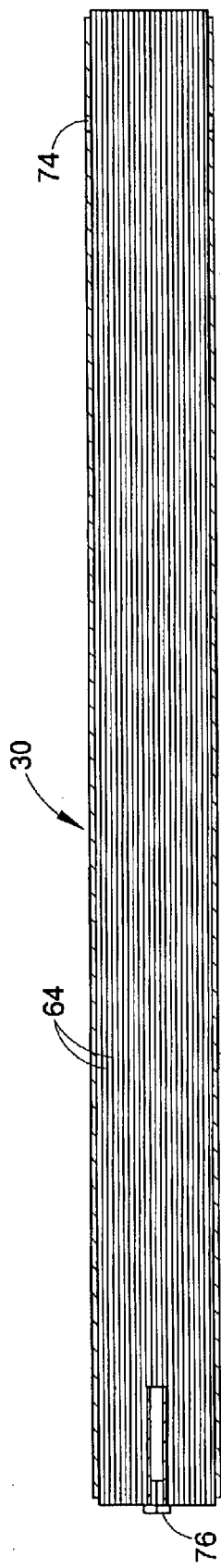
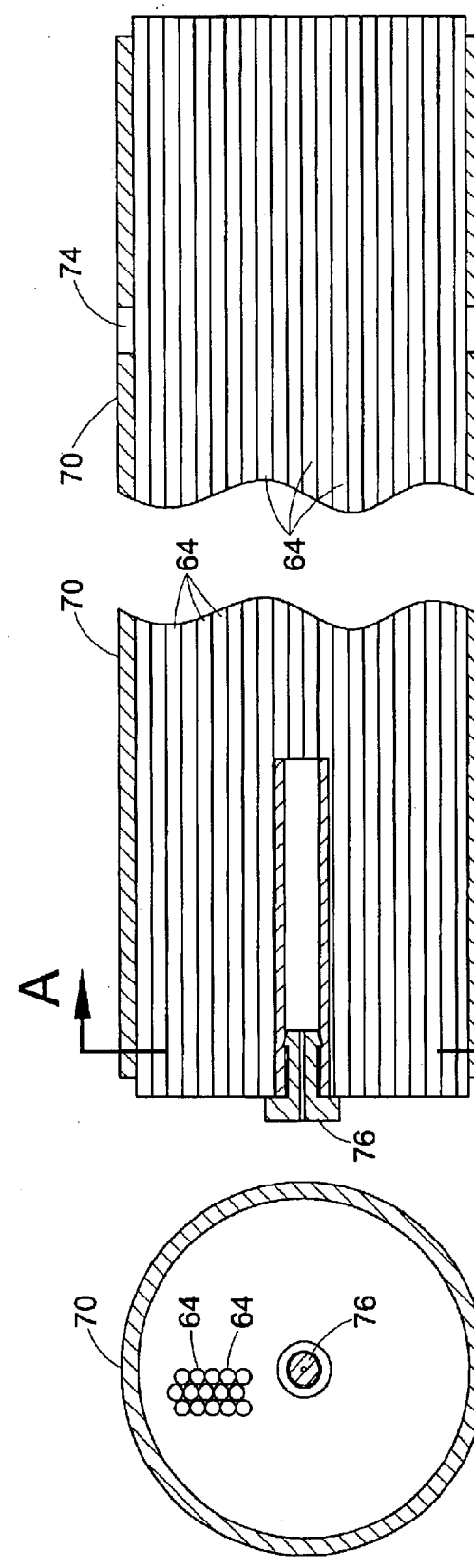
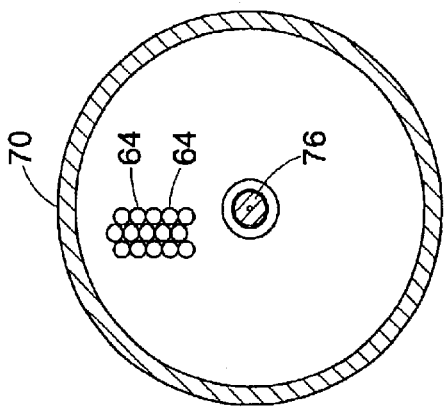

MEMBRANE AIR DRYER FOR VEHICLE AIR BRAKE SYSTEM

FIELD OF THE INVENTION

This application is a continuation-in-part application of U.S. patent application Ser. No. 10/274,215 filed on Oct. 18, 2002 for MEMBRANE AIR DRYER AND METHOD OF MOUNTING A MEMBRANE DRYER TO A VEHICLE, the entire disclosure of which is hereby incorporated by reference.

The invention relates to a vehicle air dryer and more specifically to a membrane air dryer for a vehicle.

BACKGROUND OF THE INVENTION

In air brake systems, such as those implemented in commercial trucks, compressed air from the vehicle compressor is dried prior to delivery to the vehicle brakes and other compressed air operated components. The compressed air is dried to make the vehicle brakes operate effectively, and also to prevent damage to the brakes and other downstream components. Typically, an air dryer with a desiccant bed is placed between the compressor and the brakes. The desiccant bed air dryer removes moisture from the compressed air thereby permitting only dried compressed air to continue downstream to the brakes and other components.

Several problems exist with desiccant bed air dryers. First, the desiccant degrades as it becomes contaminated with organic components, such as oil vapor or aerosols, for example. As such, the desiccant bed must be periodically changed in order to maintain an effective air dryer. Second, desiccant beads have a saturation point, beyond which no additional moisture can be absorbed. In order to maintain an effective desiccant air dryer, a periodic, purge of the desiccant is required in order to keep the desiccant from becoming saturated. In typical desiccant bed air dryers, a purge cycle is established when the compressor unloads, thereby allowing the desiccant to regenerate. In some situations, the compressor is required to maintain a lengthy cycle before it can be unloaded. These situations are somewhat frequent in commercial vehicles, such as during rapid braking and use of ancillary air powered equipment. During these long compressor cycles, the compressor charging duration can exceed the desiccant water absorption capacity and subsequent wet air can pass downstream to the brake system, or other components, where it can cause damage or other problems.

While it is known that membrane air dryers can produce a steady stream of dried air without requiring periodic change or periodic purging, membrane air dryers have generally only been implemented in clean air systems. Contaminants, such as oil aerosols, hinder the performance of membrane air dryers since the hydrophilic membrane tubes are resistant to organic components. The organic contaminants enter the membrane and foul up the surface of the membrane. This fouling of the membrane by organic contaminants prohibits air from passing through the membrane, thereby reducing the effectiveness of the membrane air dryer. As such, membrane air dryers have not been used in connection with vehicles.

SUMMARY OF THE INVENTION

An air drying system for a compressed air system of a vehicle is provided. The system includes a membrane air dryer and a means for maintaining a fairly constant and fairly low oil vapor concentration in the compressed air system. In one embodiment, a coalescing oil filter is used to maintain the oil vapor concentration below a threshold level. Another embodiment includes a pressure swing drain valve that actuates upon unloading of the vehicle compressor to discharge the filtered material.

BRIEF DESCRIPTION OF THE DRAWINGS

The membrane air dryer of the present invention may be more readily understood by reference to the following drawings. While certain embodiments are shown as illustrative examples of the membrane air dryer, the scope of this application should not be construed as limited to these illustrative examples.

FIG. 2 is a cross-sectional side view of a membrane air dryer;

FIGS. 3A and 3B are close-up cross-sectional views of the discharge and feed ends of a membrane air dryer; and FIG. 4 is a cross-sectional view of the membrane air dryer shown in FIGS. 3A and 3B, wherein the cross-section is taken through A—A.

DETAILED DESCRIPTION OF THE INVENTION

Figure 1:
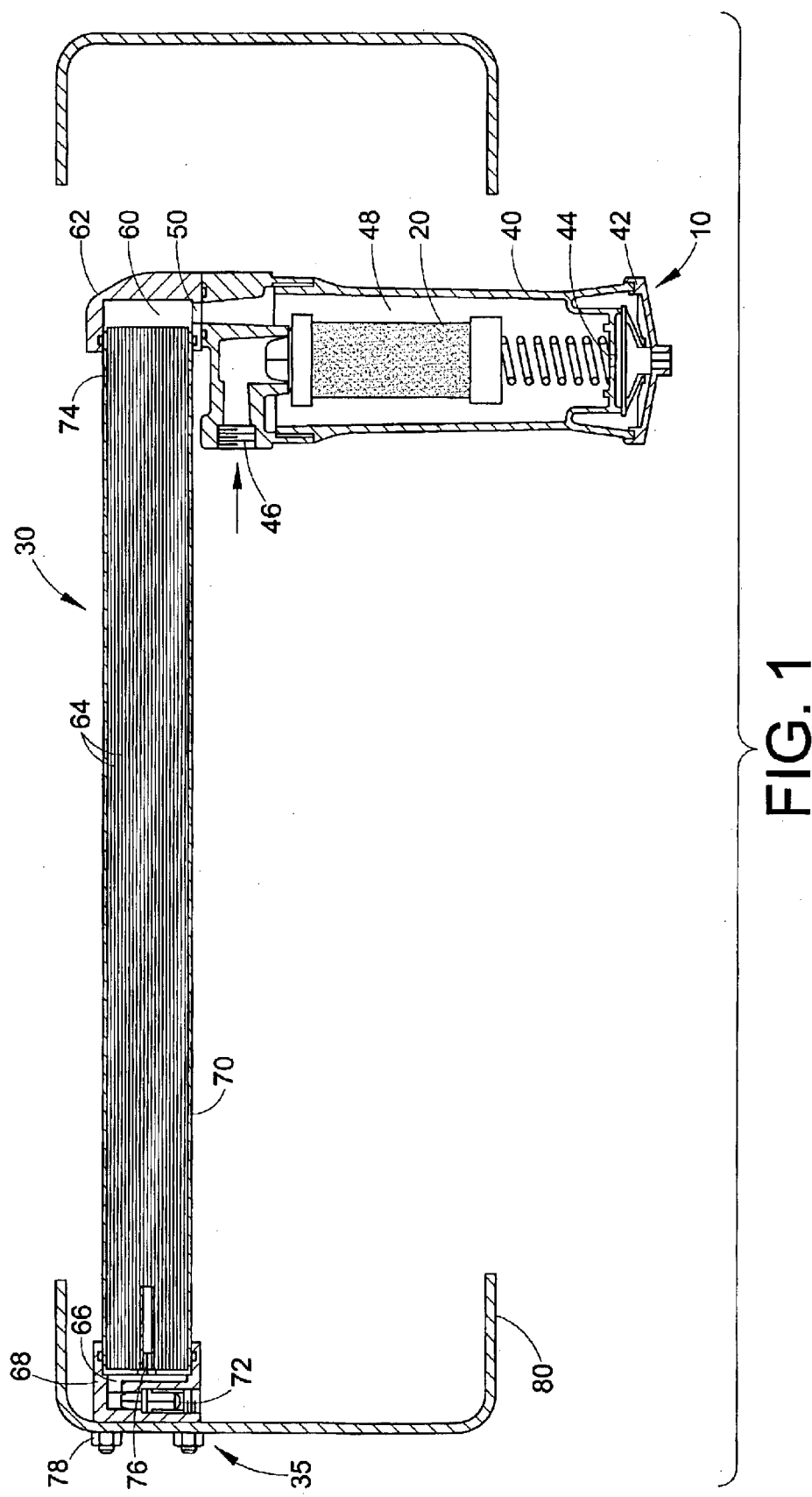
FIG. 1 is a cross-sectional side view of a membrane air dryer system of the present invention.

The vehicle air brake system membrane drying system 10 generally consists of a coalescing filter element 20, a membrane air dryer 30, and a mounting arrangement or means for attaching the membrane air dryer to a vehicle 35. While the details of the air brake system membrane drying system 10 are disclosed herein for a preferred embodiment of the invention, one skilled in the art should appreciate that the element of the membrane drying system 10, namely the coalescing filter element 20, a membrane air dryer 30, and a means for attaching the membrane air dryer to a vehicle 35, may take on a number of different embodiments. It should be understood that these additional embodiments are intended to be a part of this invention to the extent such embodiments fall within the scope of the claims.

The coalescing filter element 20 may be a single stage coalescing filter, such as, for example, a Bendix PURA-GUARD™. The filter element 20 may include a filter housing 40, a pressure swing drain valve 42, such as, for example, Bendix DV-2, and a restriction orifice 44 within the filter element housing 40. As shown in FIG. 1, air from a compressor enters through orifice 46 and then is forced through the filter element 20. Air exists the filter element 20, greatly reduced in oil vapor and aerosol concentration into filter space 48 prior to exiting the filter through exit port 50.

A pressure swing drain valve 42 may be attached to the lower portion of the filter element housing 40, thereby taking advantage of gravitational forces to assist in the collection of condensed fluids or heavier gases. One skilled in the art should appreciate that the pressure swing drain valve 42 may be located in other locations along or about the filter housing. Furthermore, the pressure swing drain valve may be integral with the filter housing, or attached as a separate unit. Additionally, the drain valve does not need to be pressure swing driven, and thus may be actuated by any other means, such as, for example, a manual drain valve or time-release drain valve. However, the use of a pressure swing drain valve is preferred since each time the compressor unloads, or stops compressing air, pressure from the discharge line falls thereby activating the pressure swing drain valve 42 which expels liquid water and/or oil from the brake system. At the connection between the pressure swing drain valve 42 and the filter space 48, a restriction orifice 44, or some other means for restricting air flow, may be placed in order to prevent pressure pulses from the compressor from activating the pressure swing drain valve 42 with each piston stroke. An orifice of about 0.046 inches is preferred.

The use of a coalescing filter 20 has been determined to facilitate in the drying of the compressed air by the membrane air dryer 30. A coalescing filter, such as the Bendix PURAGUARD™ has the capability to maintaining the oil vapor and oil aerosol concentration in the compressed air stream at a fairly consistent level. Unlike conventional desiccant dryers which continue to degrade with each exposure to contaminants, such as oil vapor, a membrane air dryer will continue to produce approximately the same results as long as the oil vapor concentration is maintained at a fairly constant level below a threshold level, which is defined by the desired air drying results. Since the membrane air dryer is typically composed of hydrophilic elements, organic compounds, such as oil, build up on the surface of the membrane. At a given concentration, the air passing over the oil condensed on the surface of the membrane will push the oil through the membrane, thereby freeing the membrane for drying. As such, there is an equilibrium concentration of oil wherein the air drying capability of the membrane is fairly constant. The coalescing filter element 20 is used to maintain the concentration of oil vapor at an equilibrium level that will produce air of a predetermined dryness. Additionally, the coalescing filter 20 may reduce the concentration of water vapor in the compressed air stream, thereby reducing the load on the membrane air dryer 30.

Filtered air leaves the filter element 20 through exit port 50 and passes to the membrane air dryer 30 through the supply port 60 located in the supply end cap 62. The compressed air, after traveling through the plurality of membrane air dryer hollow fibers 64, as shown in FIG. 4, is now dry and collected in the delivery volume 66 located in the delivery end cap 68. The dried compressed air in the delivery volume 66 is either fed through the membrane air dryer core 70 as backflow, or through a delivery check valve 72 to the air supply tanks, brakes, or other downstream components. The backflow travels along the outside of the membrane air dryer fibers 64, collects the water vapor and vents to the atmosphere through vent holes 74. Preferably, the portion of air that is used as backflow is between about 15 and 20 percent of the total dried air flow. In the embodiment shown in FIG. 3A, a metering orifice 76 is used to control the backflow rate.

Materials suitable to achieve the desired membrane morphology include those polymeric materials typically known for use in making permeable membranes exhibiting the specified morphology. Examples of the polymeric materials from which the hollow fibers are formed include, but are not limited to, polysulfones, polyethersulfones, polyarylsulfones, polycarbonates, nylons, polyimides, polyvinylidenedifluorides, polyvinylidenedichlorides, cellulosics, polyacrylonitriles, and others known to make permeable membranes, used alone or in combination. Inorganic materials capable of forming an appropriate membrane structure may also be suitable. Examples of such inorganic materials include, but are not limited to, ANOPORE® membranes, which are anodic aluminum oxide flat sheet membranes. ANOPORE® membranes are commercially available from Whatman, Inc. in Clifton, N.J. Other suitable flat sheet membranes may also be used. The desired morphology may be achieved with the suggested materials by a number of processing and formation techniques, among them phase inversion, thermal induced phase separation (TIPS), track-etching, or other known or envisioned means of fabricating permeable membranes with appropriate selective permeability. Further suitable membranes are disclosed in U.S. Pat. Nos. 5,525,143 and 6,083,297, each of which is incorporated herein by reference in its entirety.

The means for attaching the membrane air dryer 30 to a vehicle can take on a number of embodiments, such as, for example mounting bolts 78 through the vehicle frame 80 as shown in FIG. 1. Further mounting arrangements are disclosed in commonly-owned co-pending U.S. application Ser. No. 10/274,215. Such mounting arrangements may also be dictated by the structure of the coalescing filter 20 and membrane air dryer 30, such as an embodiment wherein the coalescing filter 20 and membrane air dryer 30 are integral.

It will be appreciated that the membrane air dryer assembly can take the form of various configurations and mounting arrangements. It should be further understood that the membrane air dryer and corresponding end caps can be used either with new equipment, or retrofit to attach to existing components. Such existing components may cause minor alternations to the design of the membrane air dryer; however one skilled in the art should appreciate that these minor modifications fall within the scope of this application. This invention is intended to include such modifications and alterations in so far as they fall within the scope of the appended claims or the equivalents thereof.

What is claimed is:

1. A method of drying a compressed air stream on a vehicle, comprising the steps of:

supplying the compressed air stream to a coalescing filter element, wherein said coalescing filter element is disposed within a filter housing;

filtering the compressed air stream with said coalescing filter element;

supplying the compressed air stream to a membrane air dryer;

drying said compressed air stream;

delivered the dried compressed air stream to one or more downstream components; and draining filtered material from said filter housing, wherein draining is preformed by a pressure swing drain valve; wherein said pressure swing drain valve is activated by a pressure swing within the coalescing filter housing caused by the unloading of a compressor.

2. An air drying system for a compressed air system of a vehicle, comprising:

a coalescing filter element located downstream from a vehicle compressor, wherein said coalescing filter element is disposed within a coalescing filter housing;

a membrane air dryer attachable to the vehicle, wherein said membrane air dryer receives a compressed air stream from said coalescing filter element; and a pressure swing drain valve attached to said coalescing filter housing, wherein said pressure swing drain valve is activated to discharge filtered material from said coalescing filter element when there is a pressure swing within the coalescing filter housing caused by the unloading of a compressor.

3. The air drying system of claim 2, wherein said pressing swing drain valve is actuated each time the compressor unloads.

4. The air drying system of claim 2, wherein said pressure swing drain valve includes a restriction orifice.

5. The air drying system of claim 4, wherein said restriction orifice is between about 0.04 inches and about 0.06 inches.

6. The air drying system of claim 2, wherein said membrane air dryer comprises a supply end cap, a membrane air dryer core, and a delivery end cap, wherein said membrane air dryer core includes a plurality hollow fiber membrane tubes.

7. The air drying system of claim 6, wherein said membrane air dryer further comprises a metering orifice for creating a backflow of air through said membrane air dryer core.

8. The air drying system of claim 7, wherein said metering orifice allows between about 15 and about 20 percent of the compressed air stream exiting said plurality of hollow fiber membrane to flow back through said membrane air dryer core.

9. The air drying system of claim 6 further comprising a check valve disposed within said delivery end cap, said check valve regulating the flow of the compressed air stream between the membrane air dryer and one or more downstream components.

* * * * *